United States Patent [19]

Moser et al.

[11] Patent Number: 5,511,502

[45] Date of Patent: Apr. 30, 1996

[54] AUTOMATIC LOADER FOR A STATOR COIL LACING MACHINE

[75] Inventors: Keith W. Moser, Fort Wayne; David G. Bouman, Ossian, both of Ind.

[73] Assignee: Alliance Winding Equipment, Inc., Fort Wayne, Ind.

[21] Appl. No.: 201,639

[22] Filed: Feb. 25, 1994

[51] Int. Cl.⁶ .............................. D05B 3/00; B65G 37/00
[52] U.S. Cl. ................... 112/470.21; 112/475.07; 112/2; 112/303; 112/470.14; 198/346.2
[58] Field of Search ............... 112/2, 121.2, 121.15, 112/303, 113, 262.1, 470.21, 470.14, 475.07; 198/346.2, 345.1

[56] References Cited

U.S. PATENT DOCUMENTS

| | | |
|---|---|---|
| 2,580,871 | 1/1952 | Wirtz . |
| 2,656,964 | 10/1953 | Detrez ............................ 198/345.1 |
| 2,883,949 | 4/1959 | Ammann . |
| 3,050,019 | 8/1962 | Muskulus . |
| 3,082,966 | 3/1963 | Frederick . |
| 3,227,382 | 1/1966 | Frederick . |
| 3,323,558 | 6/1967 | Collins . |
| 3,338,273 | 8/1967 | Kalning . |
| 3,342,223 | 9/1967 | Hall et al. . |
| 3,344,760 | 10/1967 | Muskulus et al. . |
| 3,344,813 | 10/1967 | Kaiser . |
| 3,440,979 | 4/1969 | Frederick . |
| 3,659,337 | 5/1972 | Gawthrop et al. . |
| 3,685,470 | 8/1972 | Frederick . |
| 3,813,754 | 6/1974 | Fields et al. . |
| 3,824,940 | 7/1974 | Habegger et al. . |
| 3,844,235 | 10/1974 | Habegger . |
| 3,862,493 | 1/1975 | Habegger et al. . |
| 3,985,162 | 10/1976 | Redman . |
| 4,107,592 | 8/1978 | Bayer . |
| 4,156,443 | 5/1979 | Nishikawa et al. . |
| 4,312,283 | 1/1982 | Fischer et al. . |
| 4,412,163 | 10/1983 | Angersbach et al. . |
| 4,614,161 | 9/1986 | Frederick . |
| 4,671,465 | 6/1987 | Lemley et al. . |
| 5,010,638 | 4/1991 | Lanfranco . |

FOREIGN PATENT DOCUMENTS

| | | |
|---|---|---|
| 54-104502 | 8/1979 | Japan . |
| 2-214445 | 8/1990 | Japan . |
| 3-98440 | 4/1991 | Japan . |

*Primary Examiner*—Paul C. Lewis
*Attorney, Agent, or Firm*—Barnes & Thornburg

[57] ABSTRACT

An automatic loader for a stator coil lacing machine includes structure for advancing a stator from a first position adjacent an arbor of the machine to a second position away from the arbor. The automatic loader also includes structure for moving the arbor between a lowered position away from the stator whereby the advancing structure moves the stator between first and second positions, and a raised position so that the stator is positioned on the arbor. The automatic loader may further include structure for disengaging a lacing cord feeder tube reciprocating drive of the machine from a cam of the machine when the arbor is lowered so the reciprocating drive is drivingly reengaged with the cam when the arbor is raised. The automatic loader may also include structure for maintaining driving engagement between a lacing needle drive of the machine and a lacing cord feeder tube oscillating drive when the arbor is raised and lowered. The advancing structure may include a table on which the stator lies and structure for rotating the table so that the stator moves between first and second positions. The automatic loader may also include structure for uncoupling an indexing motor of the machine from an indexing ring of the machine when the rotating structure moves the stator between first and second positions. The present invention also includes a method of loading and unloading a stator respectively on and from a stator coil lacing machine.

38 Claims, 4 Drawing Sheets

AUTOMATIC LOADER FOR A STATOR COIL LACING MACHINE

BACKGROUND AND SUMMARY OF THE INVENTION

The present invention relates to an automatic loader for a stator coil lacing machine used to lace the end coils or end windings of a stator. More particularly, the present invention relates to an automatic loader for a stator coil lacing machine that lowers an arbor of the machine so that an indexing table of the automatic loader can advance a stator on the table to a position adjacent the arbor so that the arbor can be subsequently raised to position the stator on the arbor for lacing of the end coils or end windings and subsequently lowered after lacing so that the indexing table can move the laced stator away from the arbor as well as to a method for automatically loading and unloading a stator respectively on and from a stator coil lacing machine.

Stator coil lacing machines are known. These machines typically include an arbor on which a stator is positioned lie, one or mole lacing needles for stitching lacing cord around end coils or end windings of the stator, a lacing cord feeder tube for supplying lacing cold to the lacing needle, and an indexing ring for advancing the stator through an arc so that the end coils or end windings can be laced.

Some stator coil lacing machines rely on manual loading and unloading of stators on and from the arbor of the machine. Such manual loading and unloading is time consuming, repetitious, and can potentially injure an inattentive, careless operator who inadvertently contacts one or more of the needles of the machine during either loading or unloading.

Pick-and-place units for automatically loading stators onto arbors of stator coil lacing machines are known. Such pick-and-place assemblies free an operator of the machine from the task of loading and unloading, thereby allowing him or her concentrate on other activities. In addition, loading and unloading pick-and-place assemblies help protect inattentive, careless operators from possible injury resulting from contact with the lacing needles.

Current pick-and-place assemblies for stator coil lacing machines, as presently known by Applicants, load only a single stator onto the machine at any one time for lacing. Subsequent to lacing of the end coils or end windings, the laced stator is removed from the machine by the pick-and-place assembly and a new, unlaced stator then loaded on the machine for lacing.

An automatic loader for a stator coil lacing machine that increased machine output capacity by decreasing idle time required for loading and unloading of stators would be a welcome improvement. Accordingly, the present invention provides an automatic loader for a stator coil lacing machine having an arbor on which the stator is positioned to lie, one or more lacing needles for stitching lacing cord around end coils or end windings of the stator, and a lacing cord feeder tube for supplying lacing cord to the one or more lacing needles. The automatic loader includes a table on which a stator is positioned to lie. A motor of the automatic loader rotates the table to move the stator between a first position adjacent the arbor and a second position where the stator is away from the arbor. The automatic loader also includes structure for moving the arbor between a lowered position away from the stator to allow the motor to rotate the table so that the stator is above the arbor, and a raised position to allow the stator to be positioned to lie on the arbor so that the end coils or end windings of the stator can be laced. The automatic loader further includes structure for disengaging a reciprocating drive of the lacing cord feeder tube from a cam of the machine when the arbor is in the lowered position so that the reciprocating drive is drivingly reengaged with the cam when the moving structure for the arbor repositions the arbor in the raised position.

The reciprocating drive includes a cam follower coupled to a cam follower body that is drivingly joined to the lacing cord feeder tube. The cam follower is drivingly engaged with the cam when the arbor is in the raised position and disengaged from the cam when the arbor is in the lowered position.

In preferred embodiments, the disengaging structure includes a stop coupled to a base of the machine on which the cam follower body is positioned to lie when the cam follower is disengaged from the cam so that the cam follower is properly oriented to drivingly reengage the cam when the arbor moving structure repositions the arbor in the raised position. The stop may include a threaded fastener.

The lacing cord feeder tube of the machine may include an outer lacing cord feeder tube and an inner lacing cord feeder tube positioned to lie within the outer lacing cord feeder tube. In this embodiment of the machine, the reciprocating drive includes a first cam follower coupled to a first cam follower body that is drivingly joined to the outer lacing cord feeder tube and a second cam follower coupled to a second cam follower body that is drivingly joined to the inner lacing cord feeder tube. The first and second cam followers are drivingly engaged with the cam when the arbor is in the raised position and disengaged from the cam when the arbor is in the lowered position. The disengaging means for this machine embodiment includes a first stop coupled to the base of the machine on which the first cam follower body is positioned to lie when the first cam follower is disengaged from the cam and a second stop coupled to the base of the machine on which the second cam follower body is positioned to lie when the second cam follower is disengaged from the cam. The first and second stops allow the first and second cam followers to be correctly oriented to drivingly reengage the cam when the arbor moving structure repositions the arbor in the raised position. Preferred embodiments of the first and second stops include threaded fasteners.

The automatic loader further includes structure for maintaining driving engagement between a lacing needle drive of the machine and an oscillating drive of the lacing cord feeder tube when the arbor is moved between lowered and raised positions. In an embodiment of the machine, the oscillating drive includes a first crank drivingly coupled to the lacing needle drive by the driving engagement maintaining structure and a second crank drivingly coupled to the lacing cord feeder tube. The first crank includes a connecting rod having first and second ends. The first end is drivingly coupled to the lacing needle drive by the driving engagement maintaining structure and the second end is drivingly coupled to the second crank.

In preferred embodiments, the driving engagement maintaining structure includes an end block coupled to the first end of the connecting rod that is formed to include an aperture. The driving engagement maintaining structure further includes a pivot rod slidably positioned to lie within the aperture of the end block, coupled on one end to the lacing needle drive, and configured to have a length sufficient to allow the end block to travel along a portion of the length of the pivot rod as the arbor is moved between raised and lowered positions so that driving engagement between the pivot and connecting rods is maintained.

In preferred embodiments, the oscillating drive includes a key on the lacing cord feeder tube that is coupled to and drivingly engaged by the second crank. In addition, in some embodiments of the machine, the lacing cord feeder tube includes an outer lacing cord feeder tube and an inner lacing cord feeder tube positioned to lie within the outer lacing cord feeder tube. In these embodiments, the outer lacing cord feeder tube has a key that is coupled to and drivingly engaged by the second crank. The inner lacing cord feeder tube includes a key that is drivingly engaged by the outer lacing cord feeder tube.

The automatic loader further includes structure for indexing the stator through an arc when positioned to lie on the arbor so that the end coils or end windings of the stator can be laced. The indexing structure includes a rotating nest assembly on the table and a rotating nest drive assembly drivingly coupled to the nest assembly to advance the nest assembly through the arc. The rotating nest drive assembly includes structure for uncoupling a tooling index drive motor of the rotating nest drive assembly from the rotating nest assembly when the rotating motor moves the stator between the first and second positions. In preferred embodiments, the uncoupling structure includes an anti-rotation cam.

Two rotating nest assemblies may be on the table at different locations. In this embodiment, the tooling index drive motor advances only that rotating nest assembly located at the first position adjacent the arbor.

The present invention also relates to a method of loading and unloading a stator respectively on and from a stator coil lacing machine which has an arbor on which the stator is positioned to lie, a lacing needle for stitching lacing cord around coils of the stator, and a lacing cord feeder tube for supplying lacing cord to the lacing needle. The method includes the steps of moving the arbor of the machine to a lowered position, placing the stator on the table, rotating the table to a first position so that the stator is positioned to lie above the arbor, moving the arbor to a raised position so that the stator is positioned to lie adjacent the arbor, lacing the stator coils of the stator, lowering the arbor away from the stator, and rotating the table to a second position so that the stator is away from the arbor.

Other objects, advantages and novel features of the present invention will become apparent from the following detailed description of the invention when considered in conjunction with the accompanying drawings.

DETAILED DESCRIPTION OF THE DRAWINGS

Figure 1:
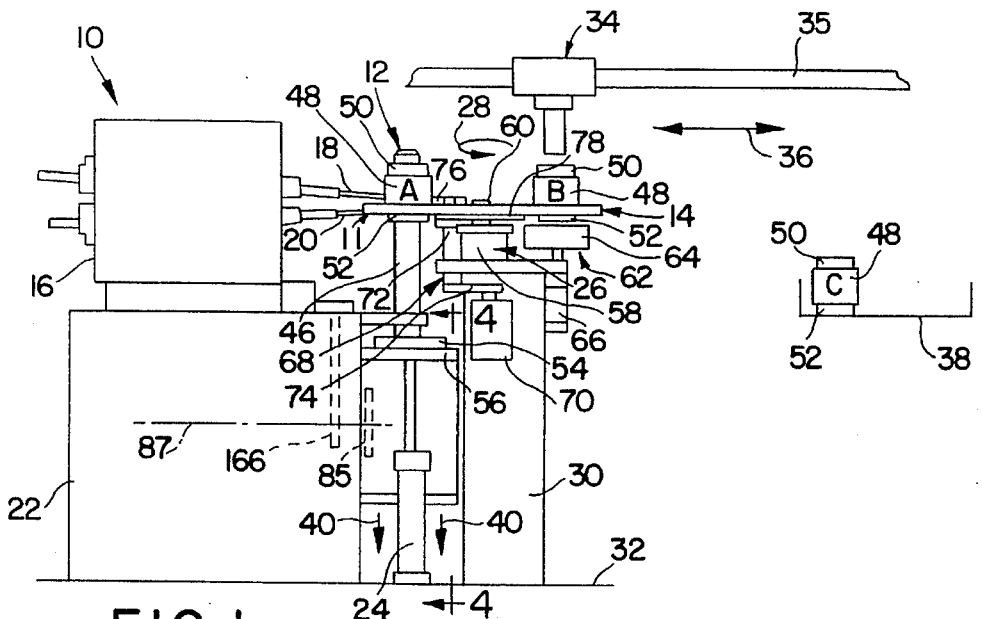
FIG. 1 is a diagrammatic view illustrating a stator coil lacing machine with an automatic loader of the present invention that includes a table on which stators A and B are placed so that stator A is positioned to lie on an arbor of the machine for lacing of the end coils or end windings of a stator.

A stator coil lacing machine 10 and automatic loader 11 of the present invention are shown in FIG. 1. Stator coil lacing machine 10 includes a workstation area 12, an upper machine section 16 that houses respective upper and lower lacing needles 18 and 20, and a lower machine section 22 that houses a main motor (not shown) of machine 10. Automatic loader 11 includes an indexing turntable 14 on which stators A and B are positioned to lie. Workstation area 12 of machine 10 can be moved between raised and lowered positions by a pair of pneumatic cylinders 24, only one of which is shown in FIG. 1. Automatic loader 11 further includes an indexing motor assembly 26 that can rotate indexing turntable 14 in a counterclockwise direction generally indicated by arrow 28 so that the position assumed by stators A and B can be switched. Indexing turntable 14 and indexing motor assembly 26 are supported on a pedestal or frame 30 which is attached to a generally horizontal support 32 such as a building floor.

A pick-and-place assembly 34 is movable along a rail 35 in the general direction indicated by double-headed arrow 36 to load unlaced stators such as stator C from conveyor 38 onto indexing turntable 14 to be laced and laced stators, such as stator A from indexing turntable 14 onto conveyor 38. It should be noted that pick-and-place assembly 34 can be eliminated and stators manually loaded on and unloaded from table 14.

Figure 2:
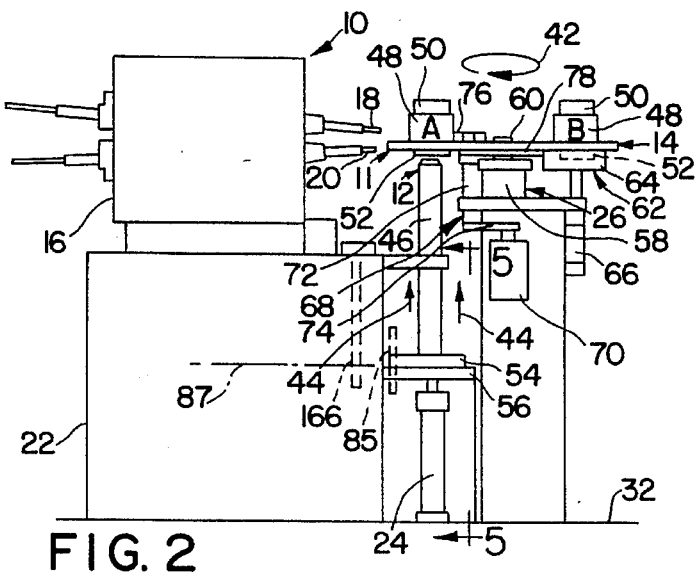
FIG. 2 is a diagrammatic view of the stator coil lacing machine and automatic loader of the present invention showing the arbor of the machine in a lowered position so that the table of the automatic loader can be rotated to change the positions of stators A and B so that laced stator A can be removed from the machine by a pick-and-place assembly.
Figure 3:
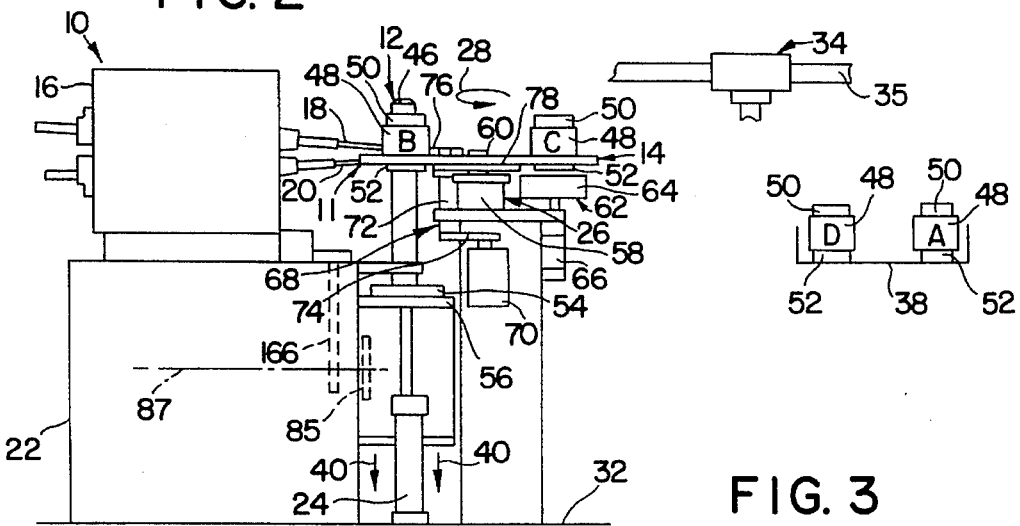
FIG. 3 is a diagrammatic view of the stator coil lacing machine and automatic loader of the present invention showing stators B and C positioned on the table, the arbor of the machine returned to the raised position so that stator B is positioned to lie on the arbor for the end coils or end windings of stator B to be laced, and a conveyor on which laced stator A and new, unlaced stator D are positioned to lie.

Workstation area 12 can be moved in the direction generally indicated by arrows 40 from a raised position, shown in FIG. 1, to a lowered position shown in FIG. 2. Lowering workstation area 12 allows indexing turntable 14 to be rotated by indexing motor assembly 26 in a clockwise direction generally indicated by arrow 42 so that laced stator A can assume the position of unlaced stator B to be subsequently unloaded by pick-and-place assembly 34 onto conveyor 38 and unlaced stator B can assume the position of laced stator A to be subsequently laced. After rotating table 14, workstation area 12 is moved in an upward direction generally indicated by arrows 44 so that workstation area 12 again assumes a raised position as shown in FIG. 3 so that end coils or windings of stator B can be laced. FIG. 3 further illustrates laced stator A positioned on conveyor 38 by pick-and-place assembly 34 and new, unlaced stator C positioned on table 14 by pick-and-place assembly 34 for subsequent lacing after stator B.

The diagrammatic views of the stator coil lacing machine 10 and automatic loader 11 of the present invention shown in FIGS. 1–3 illustrate the increased laced stator output provided by the present invention. That is, the automatic loader 11 of the present invention allows a stator to be simultaneously laced while another stator that has already been laced is removed from the machine and a new, unlaced, stator positioned on the machine for subsequent lacing. In addition, the present invention eliminates the need for manual loading and unloading of stators from the machine. As is known, inadvertent operators of stator coil lacing machines often receive unintended injuries from components of machine 10, such as upper and lower lacing needles 18 and 20, due to their carelessness during loading and unloading of stators on and from machine 10.

Referring collectively to FIGS. 1–3, workstation 12 is shown as including an outer arbor 46 on which metal cores 48 of stators, such as stators A–D, are positioned to lie so that upper and lower end coils or end windings 50 and 52 can be respectively laced by upper and lower lacing cord needles 18 and 20. An inner arbor (not shown) is positioned to lie within an outer arbor 46. Inner and outer lacing cord feeder tubes (shown in FIGS. 4 and 5 and discussed below in more detail) are positioned to lie within the inner arbor. As is known, outer arbor 46 is removable from machine 10 to provide access to the inner arbor as well as the inner and outer lacing cord feeder tubes. An outer arbor plate 54 controls the relative positioning of outer arbor 46 on machine 10.

A pair of pneumatic cylinders 24 raise and lower outer arbor 46. Pneumatic cylinders 24 are connected between an upper plate 56 of workstation area 12 and support 32.

Indexing motor assembly 26 includes an indexing motor 58 which drives indexing turntable 14 via an indexing motor shaft 60. In preferred embodiments, indexing motor 58 is a pneumatically operated rotary actuator that is configured to rotate shaft 60 so that indexing turntable 14 alternately rotates 180° in clockwise and counterclockwise directions. It should be noted, however, that other embodiments of automatic loader 11 of the present invention may utilize different indexing motors that rotate indexing turntable 14 the same or a different number of degrees. For example, another embodiment of machine 10 may have more than two stator positions on indexing turntable 14 which would require less than 180° of rotation from one station to another. For example, machine 10 could include three stator positions spaced 120° apart from one another.

A pneumatically operated unclamping assembly 62 includes an unclamping ring 64 that is driven by a pneumatic cylinder 66 which is attached to pedestal or frame 30. Pneumatic cylinder 66 moves unclamping ring 64 between a lowered position shown in FIGS. 1 and 3 away from a stator and a raised position shown in FIG. 2 adjacent a stator. As discussed below in connection with FIG. 6, positioning unclamping assembly 62 in the raised position moves stator clamps on indexing turntable 14 away from a metal core 48 of a stator so that pick-and-place assembly 34 can remove the stator from indexing turntable 14.

A rotating nest drive assembly 68 is coupled to pedestal or frame 30 as shown in FIGS. 1–3. Rotating nest drive assembly 68 includes a tooling index drive motor 70 and a rotatable shaft (not shown) rotatably positioned within bearing housing 72. Motor 70 is drivingly coupled to an end of the shaft by a belt 74. In preferred embodiments, tooling index drive motor 70 includes a DC stepping motor. A pair of cam follower assemblies 76 and 77 (only one of which is shown in FIGS. 1–3) are coupled to table 14 so as to rotate with table 14. A fixed anti-rotation cam 78 is positioned under table 14. The purpose and function of cam follower assemblies 76 and 77 and anti-rotation cam 78 is discussed below in connection with FIG. 6.

Figure 4:
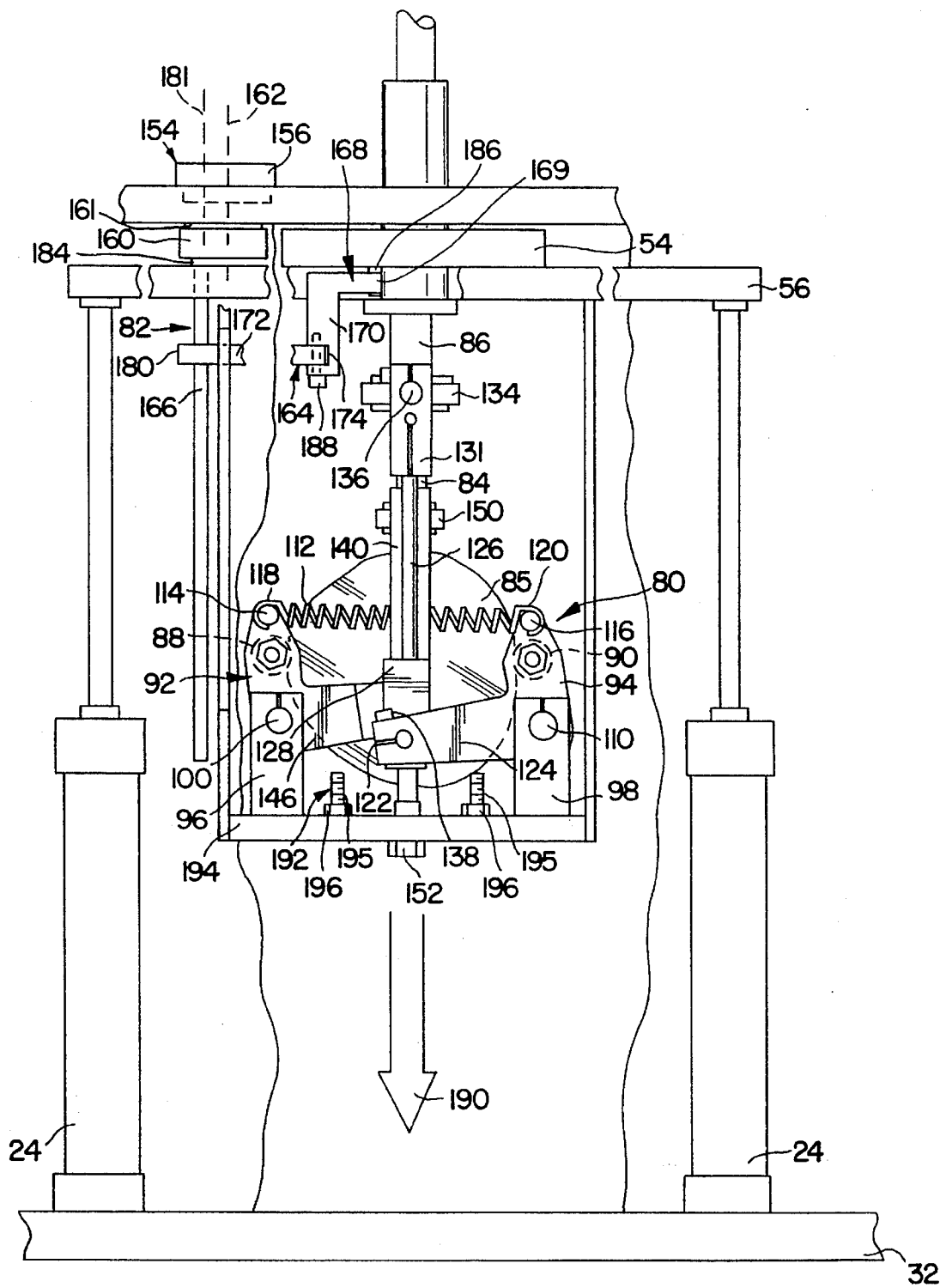
FIG. 4 is a view taken along line 4—4 of FIG. 1 illustrating a movable portion of the machine in a raised position, a lacing cord feeder tube reciprocatory drive mechanism of the machine engaged with a cam of the machine, a pair of stops of the automatic loader, a lacing cord feeder tube oscillatory drive mechanism engaged with a lacing needle drive mechanism via an end block and pivot rod of the automatic loader, and a pair of pneumatic cylinders of the automatic loader used to move the portion of the machine between the raised position and a lowered position.

An internal end view of a portion of the components of machine 10 when workstation area 12 is in the raised position is shown in FIG. 4. In particular, FIG. 4 shows the positions assumed by respective reciprocatory and oscillatory drive mechanisms 80 and 82 for inner and outer lacing cord feeder tubes 84 and 86 when workstation area 12 is in the raised position. As can be seen in FIG. 4, inner lacing cord feeder tube 84 is positioned to lie within outer lacing cord feeder tube 86.

Figure 5:
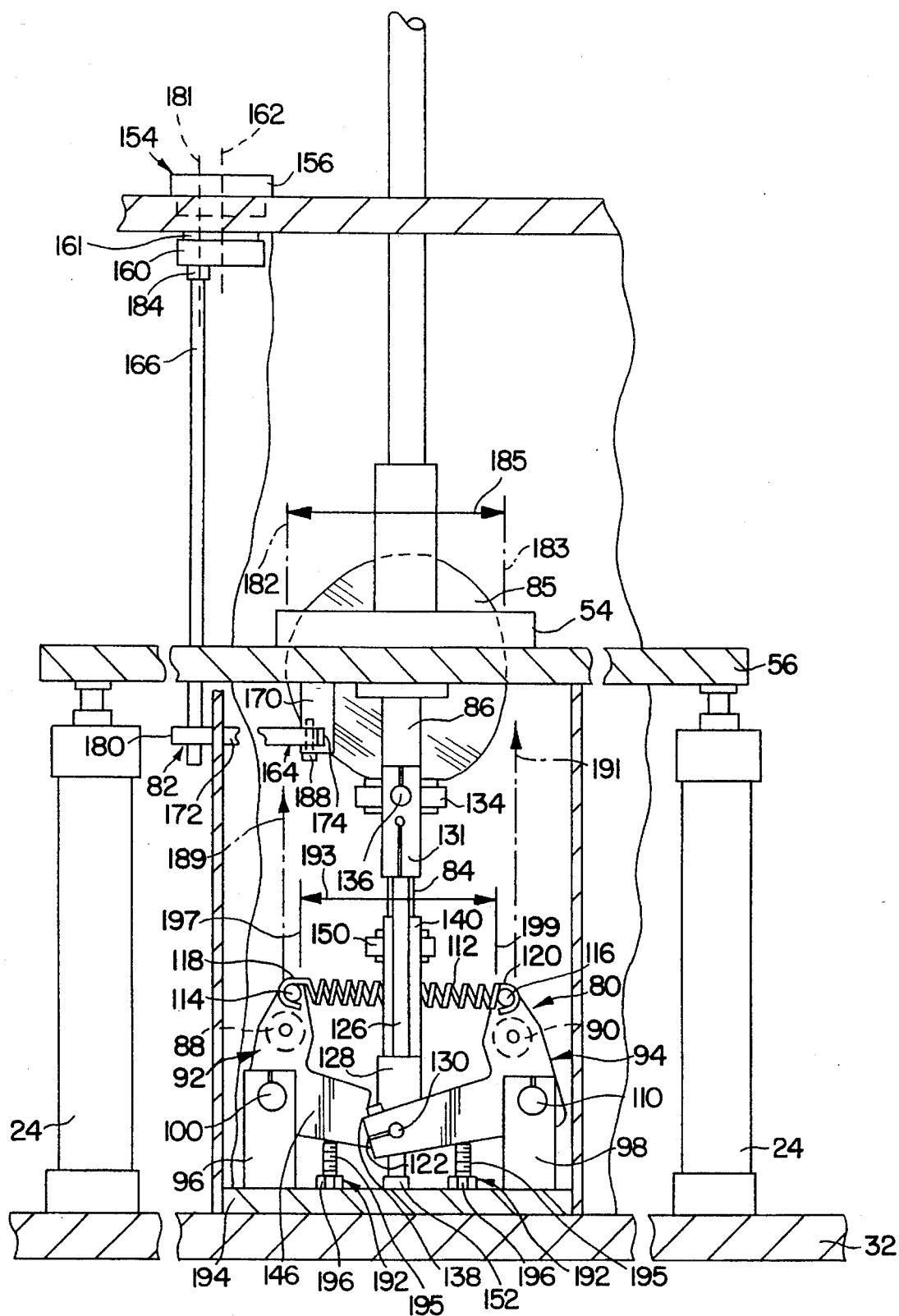
FIG. 5 is a view taken along line 5—5 of FIG. 2 illustrating the movable portion of the machine in the lowered position with the lacing cord feeder tube reciprocatory drive mechanism disengaged from the cam and positioned to lie on the stops and the lacing cord feeder tube oscillatory drive mechanism engaged with the lacing needle drive mechanism via the end block and pivot rod.

Reciprocatory drive mechanism 80 is shown as being engaged with an eccentric cam 85 that is driven by a main shaft of a motor (generally indicated by dashed line 87 in FIGS. 1–3) of stator coil lacing machine 10. Reciprocatory drive mechanism 80 includes cam followers 88 and 90 which are respectively separately coupled to generally L-shape upper and lower cam follower support bodies 92 and 94. Cam followers 88 and 90 are pivotally coupled to eccentric cam 85 by the pivotal mounting of upper and lower cam follower support bodies 92 and 94 to respective pivot supports 96 and 98 via pivot pins 100 and 110 and also by spring 112 which is coupled to upper and lower cam follower support bodies 92 and 94 via spring attachment pins 114 and 116 formed adjacent first distal ends 118 and 120 of bodies 92 and 94. Lower cam follower support body 94 is drivingly coupled to outer lacing cord feeder tube 86 by a pair of connecting rods 126 (only one of which is shown in FIGS. 4 and 5). A connecting plate 128 is attached to an end of each connecting rod 126 that couples that end of connecting rod 126 to second distal end 122 of a leg 124 (only one of which is shown in FIGS. 4 and 5) of lower cam follower support body 94 via a pivot pin 130 and a fastener 138. A connecting plate 131 is attached to an end of each connecting rod 126 opposite the end where connecting plates 128 are attached. Connecting plates 131 drivingly couples that end of connecting rod 126 to an outer yoke 134. Outer yoke 134 is, in turn, coupled to outer lacing cord feeder tube 86.

Upper cam follower support body 92 is drivingly engaged with inner lacing cord feeder tube 84 via a pair of connecting rods 140 (only one of which is shown in FIGS. 4 and 5). A second distal end (not shown) of an upper cam follower support body leg 146 (only one of which is shown in FIGS. 4 and 5) is coupled to an end of one of the connecting rods 140 via pivot pin 130. Although not shown, the second distal end of upper cam follower support body leg 146 is a split in the same way as lower cam follower support body leg 124. A fastener (not shown) similar to fastener 138 secures upper cam follower support body leg 146 around pivot pin 130. Ends of connecting rods 140, generally opposite the ends attached to legs 146, are drivingly coupled to an inner yoke 150 via fasteners (not shown). Yoke 150, in turn, is coupled to inner lacing cord feeder tube 84.

The driving connection between eccentric cam 85, cam followers 88 and 90, upper and lower cam follower support bodies 92 and 94, connecting rods 126 and 140, outer and inner yokes 134 and 150, and outer and inner lacing cord feeder tubes 86 and 84 provides reciprocatory motion for outer and inner lacing cord feeder tubes 86 and 84 so that lacing cord inserted through thread tube eyelet 152 of inner lacing cord feeder tube 84 can be provided to upper and lower lacing needles 18 and 20 to lace end coils or end windings 50 and 52 of a stator.

Oscillatory drive mechanism 82 provides oscillatory or rotational motion for outer and inner lacing cord feeder tubes 86 and 84 along an arc of a circle. Lacing cord feeder tube oscillatory drive mechanism 82 is coupled to the reciprocatory lacing needle drive mechanism via a chain drive between a pulley or sprocket assembly (not shown) 154 of lacing cord feeder tube oscillatory drive mechanism 82 and a similar offset pulley or sprocket assembly coupled to the lacing needle reciprocatory drive mechanism. Pulley or sprocket assembly 154 includes a bearing housing 156 and a disk 160 that is coupled to bearing housing 156 via a central axis generally indicated by dashed line 162 in FIG. 4. Disk 160 includes a rim 161 which carries a flat belt or chain (not shown) that is drivingly coupled to the offset pulley or sprocket of the lacing needle reciprocatory drive mechanism.

A first crank 164 is coupled to pulley or sprocket assembly 154 by pivot rod 166. A second crank 168 is drivingly engaged with outer and inner lacing cord feeder tubes 86 and 84. First and second cranks 164 and 168 are drivingly connected together via a crank weldment 170. A connecting rod 172 of first crank 164, diagrammatically illustrated in FIGS. 4 and 5, has a first end 174 that is coupled to crank weldment 170 via a fastener 188. A second end of connecting rod 172 is configured to include an end block 180 that is formed to include an aperture in which pivot rod 166 is slidably positioned to lie.

Pivot rod 166 is coupled to disk 160 off center of axis 162 generally along dashed line 181 by T-slot bolt 184. Rotation of disk 160 creates an oscillatory motion or throw for pivot rod 166 which is converted into reciprocatory motion for connecting rod 172 and second crank 168. In preferred embodiments, an end 169 of second crank 168 is drivingly connected to a key 186 by a fastener 188. Key 186 is coupled to outer lacing cord feeder tube 86. Inner lacing cord feeder tube 84 is drivingly coupled or keyed to outer lacing cord feeder tube 86. In this manner, reciprocatory motion of connecting rod 172 and second crank 168 causes outer and inner lacing cord feeder tubes 86 and 84 to move in an oscillatory manner along a portion of an arc of a circle. The extent of oscillatory motion of outer and inner lacing cord feeder tubes 86 and 84 is controlled by such factors as the stroke of connecting rod 176 and second crank 168.

Lacing cord feeder tube reciprocatory drive mechanism 80 is disengaged from eccentric cam 85 when workstation area 12 of stator coil lacing machine 10 is moved in a direction generally indicated by large arrow 190 from the raised position shown in FIG. 4 to a lowered position shown in FIG. 5. A pair of stops 192 are coupled to a lower plate 194, to which pivot supports 96 and 98 are also attached. One of the two legs 124 and one of the two legs 146 pivot to lie against different stops 192 when workstation area 12 is moved to the lowered position. Stops 192 limit movement and maintain proper orientation of cam followers 88 and 90 relative to eccentric cam 85 so that they may be reengaged with eccentric cam 85 a spaced distance apart generally indicated by lines 182 and 183 and double-headed arrow 185 when workstation area 12 is moved back to a raised position in the direction generally indicated by arrows 189 and 191.

In preferred embodiments, stops 192 include a pair of threaded fasteners that are secured to lower plate 194 via a pair of threaded nuts 196. The height of stops 192 can be adjusted to properly orient cam followers 88 and 90 a predetermined distance apart, as generally indicated by double-headed arrow 193 and lines 197 and 199, when workstation area 12 is lowered, so that they will be properly oriented when reengaged with eccentric cam 85 when workstation area 12 is raised. Absent stops 192, cam followers 88 and 90 would pivot inwardly toward one another to a point where they would not be properly oriented when reengaged with cam 85.

The sliding connection between pivot rod 166 and rod end block 180 maintains engagement of lacing cord feeder tube oscillatory drive mechanism 82 with the lacing needle reciprocatory drive mechanism when workstation area 12 is lowered. As can be seen in FIG. 5, pivot rod 166 is formed a predetermined length that prevents pivot rod 166 from becoming uncoupled from end block 180 during movement of workstation area 12 between raised and lowered positions.

Indexing turntable 14 includes a pair of rotating nest assemblies 198 and 200 that turn a stator 360° during lacing of end coils or end windings 50 and 52. Rotating nest assemblies 198 and 200 each include respective indexing rings 211 and 217 and respective drive gears 213 and 219. Drive gears 213 and 219 mesh with a gear (not shown) of cam follower assemblies 76 and 77 to rotate indexing rings 211 and 217 when adjacent workstation area 12.

As discussed above, rotating nest assemblies 198 and 200 include one or more spring loaded stator clamps 210 that are coupled to indexing rings 211 and 217 to engage a metal core 48 of a stator to help secure the stator within rotating nest assemblies 198 and 200. Stator clamps 210 are biased so that they normally assume the position shown in FIG. 6 which causes them to engage metal core 48. As discussed above, to remove a stator from either rotating nest assembly 198 or 200, pneumatic cylinder 66 must move unclamping ring 64 to a raised position so that stator clamps 210 pivot on axes generally indicated by lines 212 to a raised position disengaged from a metal core 48.

Figure 6:
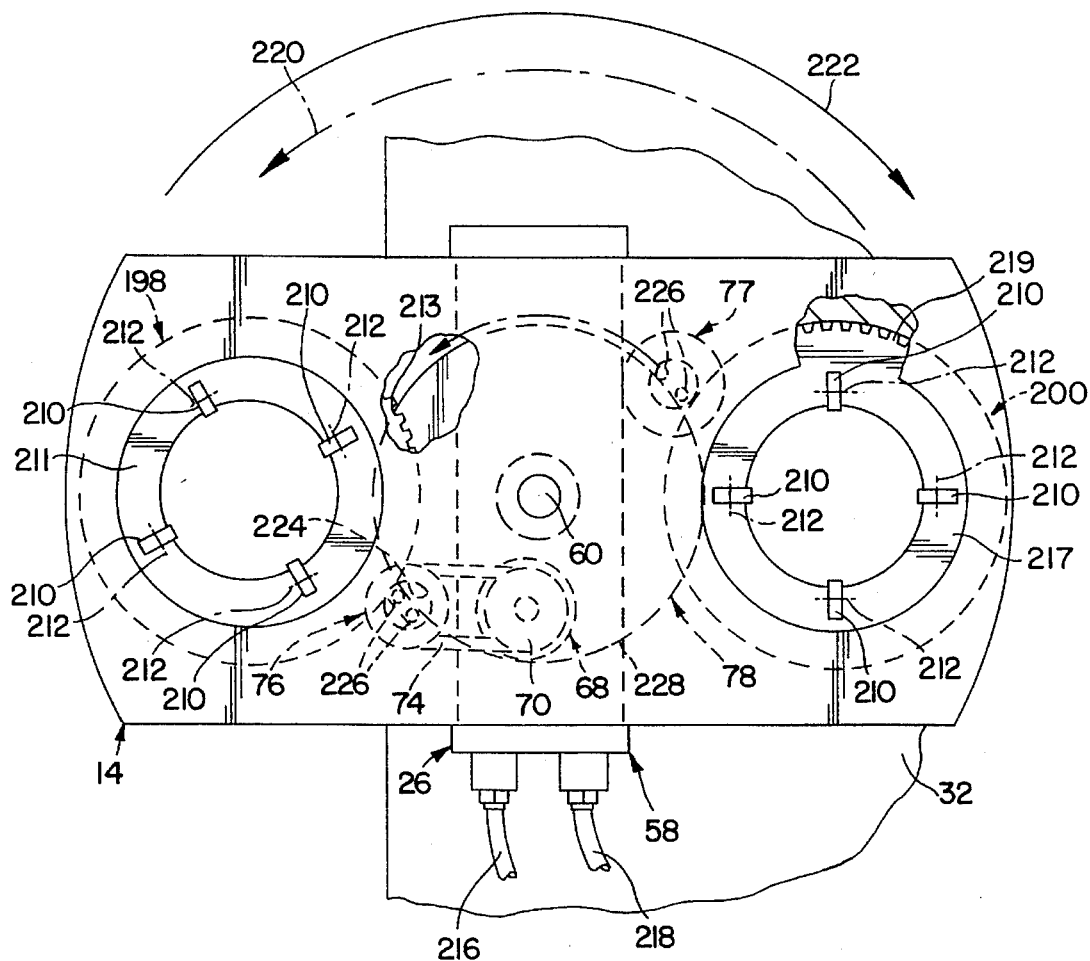
FIG. 6 is a top view of a table of the automatic loader of the present invention having a pair of rotating nests in which stators are positioned to lie and which are alternately advanced by driving engagement between rotating nest drive assemblies and a tooling index drive motor so that end coils or end windings of the stator can be laced.

As can be seen in FIG. 6, anti-rotation cam 78 is generally circular in shape and includes a generally semicircularly shaped notch 224. Notch 224 is positioned adjacent workstation area 12. As can be further seen in FIG. 6, cam follower assemblies 76 and 77 each include a pair of cam followers 226. A plate (not shown) is coupled to an end of the rotating shaft (also not shown) which is positioned within bearing housing 72. The plate engages and rotates cam followers 226 so that cam follower assembly 76 rotates drive gear 213 to turn indexing ring 211. Cam followers 226 of cam follower assembly 76 are free to rotate because of alignment with notch 224. Cam followers 226 of cam follower assembly 77 cannot rotate because of contact with edge 228 of anti-rotation cam 78.

The position of cam follower assembly 77 can be changed by turning table 14 so that assembly 77 assumes the position of cam follower assembly 76 shown in FIG. 6. In this position, cam followers 226 of assembly 77 are engaged and rotated by the plate of the shaft. Cam followers 226 of assembly 77 are free to rotate when in this position because they are aligned with notch 224.

FIG. 6 shows indexing motor 58 as a pneumatically operated rotary actuator which, as discussed above, is the preferred embodiment for indexing motor 58. A pair of pneumatic lines 216 and 218 supply a compressed fluid, such as air, that drives indexing motor shaft 60 to rotate indexing turntable 14 180° in either a counterclockwise direction generally indicated by arrow 220 or a clockwise direction generally indicated by arrow 222. Indexing turntable 14 and indexing motor 58 are configured, as shown in FIG. 6, to provide two stator positions. However, indexing turntable 14 and indexing motor 58 can be configured to have only one stator position or, alternatively, more than two stator positions. Some of the modifications necessary for a single stator position would include elimination of either rotating nest assembly 198 or rotating nest assembly 200 and the extra cam follower assembly 76 or 77. For an indexing turntable 14 having more than two stator positions, additional rotating nest assemblies, such as rotating nest assemblies 198 and 200, and cam follower assemblies, such as cam follower assemblies 76 and 77 would be necessary, as well as changing the number of degrees that indexing motor 58 rotates indexing turntable 14.

The automatic loader 11 of the present invention provides a method of loading and unloading a stator respectively on and from a stator coil lacing machine 10. The method includes a first step of moving outer arbor 46 to the lowered position, shown in FIGS. 2 and 5, via pneumatic cylinders 24. Next, an unlaced stator is placed on indexing turntable 14 either by pick-and-place assembly 34 or manually. Next, indexing turntable 14 is rotated by indexing motor assembly 26 to position the stator to lie above outer arbor 46. Pneumatic cylinders 24 move outer arbor 46 to a raised position, shown in FIGS. 1, 3, and 4, so that the stator is positioned to lie adjacent the arbor. Next, machine 10 laces upper and lower end coils or end windings 50 and 52 of the stator. Subsequent to lacing, pneumatic cylinders 24 lower outer arbor 46 and indexing motor assembly 26 rotates table 14 to a position away from outer arbor 46. The laced stator can then be removed from table 14.

From the preceding description of the preferred embodiments, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. A stator coil lacing machine, comprising:

means for orienting a first stator on the machine so that stator coils of the first stator can be laced, the orienting means including an arbor on which the first stator is positioned to lie;

means for stitching lacing cord around the first stator coils;

lacing cord handling means for receiving a continuous length of lacing cord and delivering the lacing cord to the stitching means;

means for reciprocating the lacing cord handling means so that the lacing cord handling means moves generally parallel to the arbor;

means for oscillating the lacing cord handling means so that the lacing cord handling means rotates through an arc;

a table on which the first stator is positioned to lie;

means for rotating the table so that the first stator advances from a first position adjacent the arbor to a second position away from the arbor; and means for moving the arbor between a lowered position away from the first stator to allow the rotating means to move the first stator from the first position to the second position, and a raised position to allow a second stator on the table to be positioned to lie adjacent the arbor.

2. The stator coil lacing machine of claim 1, further comprising cam means for driving the reciprocating means and means for disengaging the reciprocating means from the cam means when the arbor is in the lowered position so that the reciprocating means is drivingly reengaged with the cam means when the moving means repositions the arbor in the raised position.

3. The stator coil lacing machine of claim 2, wherein the reciprocating means includes a cam follower coupled to a cam follower body that is drivingly joined to the lacing cord handling means, the cam follower being drivingly engaged with the cam means when the arbor is in the raised position and disengaged from the cam means when the arbor is in the lowered position.

4. The stator coil lacing machine of claim 3, wherein the disengaging means includes a stop coupled to a base of the machine on which the cam follower body is positioned to lie when the cam follower is disengaged from the cam means so that the cam follower is oriented to drivingly reengage the cam means when the moving means repositions the arbor in the raised position.

5. The stator coil lacing machine of claim 4, wherein the stop includes a threaded fastener.

6. The stator coil lacing machine of claim 1, further comprising cam means for driving the reciprocating means and wherein the lacing cord handling means includes an outer lacing cord feeder tube and an inner lacing cord feeder tube positioned to lie within the outer lacing cord feeder tube and the reciprocating means includes a first cam follower coupled to a first cam follower body that is drivingly joined to the outer lacing cord feeder tube and a second cam follower coupled to a second cam follower body that is drivingly joined to the inner lacing cord feeder tube, the first and second cam followers being drivingly engaged with the cam means when the arbor is in the raised position and disengaged from the cam means when the arbor is in the lowered position.

7. The stator coil lacing machine of claim 6, wherein the disengaging means includes a first stop coupled to a base of the machine on which the first cam follower body is positioned to lie when the first cam follower is disengaged from the cam means and a second stop coupled to the base of the machine on which the second cam follower body is positioned to lie when the second cam follower is disengaged from the cam means so that the first and second cam followers are oriented to drivingly reengage the cam means when the moving means repositions the arbor in the raised position.

8. The stator coil lacing machine of claim 7, wherein the first and second stops include threaded fasteners.

9. The stator coil lacing machine of claim 2, wherein the oscillating means is drivingly coupled to the stitching means and further comprising means for maintaining driving engagement between the stitching means and the oscillating means when the arbor is moved between lowered and raised positions.

10. The stator coil lacing machine of claim 9, wherein the oscillating means includes a first crank drivingly coupled to the stitching means by the driving engagement maintaining means and a second crank drivingly coupled to the lacing cord handling means and to the first crank.

11. The stator coil lacing machine of claim 10, wherein the first crank includes a connecting rod drivingly coupled on a first end to the driving engagement maintaining means and on a second end to the second crank and further wherein the driving engagement maintaining means includes an end block coupled to the first end of the connecting rod and formed to include an aperture and a pivot rod slidably positioned to lie within the aperture of the end block, coupled on one end to the stitching means, and configured to have a length sufficient to allow the end block to travel along a portion of the length of the pivot rod as the arbor is moved between raised and lowered positions so that driving engagement between the pivot and connecting rods is maintained.

12. The stator coil lacing machine of claim 10, further comprising a key on the lacing cord handling means drivingly coupled to an end of the second crank.

13. The stator coil lacing machine of claim 10, wherein the lacing cord handling means includes an outer lacing cord feeder tube and an inner lacing cord feeder tube positioned to lie within and drivingly coupled to the outer lacing cord feeder tube.

14. The stator coil lacing machine of claim 1, further comprising means for indexing the first and second stators through an arc when positioned to lie adjacent the arbor so that stator coils of the stators can be laced, the indexing means including an indexing ring on the table and an indexing motor drivingly coupled to the indexing ring that advances the indexing ring.

15. The stator coil lacing machine of claim 14, further comprising means for uncoupling the indexing motor from the indexing ring when the rotating means moves the first stator between the first and second positions.

16. The stator coil lacing machine of claim 15, wherein the uncoupling means includes an anti-rotation cam.

17. The stator coil lacing machine of claim 14, wherein the indexing means includes a first indexing ring on the table and a second indexing ring located on the table at the position unoccupied by the first indexing ring, and further wherein the indexing motor advances the indexing ring located adjacent the arbor.

18. The stator coil lacing machine of claim 1, wherein the rotating means rotates the table to move the first stator between the first position so that the first stator lies adjacent the arbor and the second position where the first stator is away from the arbor so that the first stator can be removed from the table and a third stator placed on the table at a position previously occupied by the first stator, and further wherein the moving means lowers the arbor away from the first stator to allow the rotating means to move the first stator from the first position to the second position and raises the arbor to allow the second stator to be positioned to lie adjacent the arbor after the rotating means moves the table from the first position to the second position.

19. A stator coil lacing machine, comprising:

an arbor on which a stator is positioned to lie;

a lacing needle for stitching lacing cord around coils of the stator;

a lacing cord feeder tube for supplying lacing cord to the lacing needle;

means for advancing the stator from a first position adjacent the arbor to a second position away from the arbor; and means for moving the arbor between a lowered position away from the stator to allow the advancing means to move the stator between the first and second positions, and a raised position to position the stator on the arbor.

20. The stator coil lacing machine of claim 19, wherein the advancing means includes a table on which the stator lies and means for rotating the table so the stator moves between the first and second positions.

21. A stator coil lacing machine, comprising:

an arbor on which a stator is positioned to lie so that coils of the stator can be laced;

means for lowering the arbor below a position assumed during lacing of the stator coils;

means for advancing the stator to a first position above the arbor; and means for raising the arbor to the position assumed during lacing of the stator coils so that the stator is positioned on the arbor.

22. The stator coil lacing machine of claim 21, wherein the lowering means lowers the arbor subsequent to lacing of the stator coils and the advancing means moves the stator from the first position to a second position away from the arbor.

23. A method of loading and unloading a stator respectively on and from a stator coil lacing machine having an arbor on which a stator is positioned to lie, a lacing needle for stitching lacing cord around coils of the stator, and a lacing cord feeder tube for supplying lacing cord to the lacing needle, comprising:

moving the arbor to a lowered position;

placing the stator on the table;

rotating the table to a first position so that the stator is positioned to lie above the arbor;

moving the arbor to a raised position so that the stator is positioned to lie adjacent the arbor;

lacing the stator coils of the stator;

lowering the arbor away from the stator; and rotating the table to a second position so that the stator is away from the arbor.

24. A stator coil lacing machine, comprising:

an arbor on which a stator is positioned to lie;

a lacing needle for stitching lacing cord around coils of the stator;

a lacing cord feeder tube for supplying lacing cord to the lacing needle;

means for advancing the stator from a first position adjacent the arbor to a second position away from the arbor;

means for moving the arbor between a lowered position away from the stator to allow the advancing means to move the stator between the first and second positions, and a raised position so that the stator is positioned on the arbor; and means for disengaging a lacing cord feeder tube reciprocating drive of the stator coil lacing machine from a cam of the stator coil lacing machine when the arbor is in the lowered position so that the lacing cord feeder tube reciprocating drive is drivingly reengaged with the cam when the moving means repositions the arbor in the raised position.

25. The stator coil lacing machine of claim 24, wherein the lacing cord feeder tube reciprocating drive includes a cam follower coupled to a cam follower body that is drivingly joined to the lacing cord feeder tube, the cam follower being drivingly engaged with the cam when the arbor is in the raised position and disengaged from the cam when the arbor is in the lowered position, and further wherein the disengaging means includes a stop coupled to a base of the stator coil lacing machine on which the cam follower body is positioned to lie when the cam follower is disengaged from the cam so that the cam follower is oriented to drivingly reengage the cam when the moving means repositions the arbor in the raised position.

26. The stator coil lacing machine of claim 25, wherein the stop includes a threaded fastener.

27. The stator coil lacing machine of claim 24, wherein the lacing cord feeder tube includes an outer lacing cord feeder tube and an inner lacing cord feeder tube positioned to lie within the outer lacing cord feeder tube, the lacing cord feeder tube reciprocating drive includes a first cam follower coupled to a first cam follower body that is drivingly joined to the outer lacing cord feeder tube and a second cam follower coupled to a second cam follower body that is drivingly joined to the inner lacing cord feeder tube, the first and second cam followers being drivingly engaged with the cam when the arbor is in the raised position and disengaged from the cam when the arbor is in the lowered position, and the disengaging means includes a first stop coupled to a base of the stator coil lacing machine on which the first cam follower body is positioned to lie when the first cam follower is disengaged from the cam and a second stop coupled to the base on which the second cam follower body is positioned to lie when the second cam follower is disengaged from the cam so that the first and second cam followers are oriented to drivingly reengage the cam when the moving means repositions the arbor in the raised position.

28. The stator coil lacing machine of claim 27, wherein the first and second stops include threaded fasteners.

29. The stator coil lacing machine of claim 24, further comprising means for maintaining driving engagement between a lacing needle drive of the stator coil lacing machine and a lacing cord feeder tube oscillating drive of the stator coil lacing machine when the arbor is moved between raised and lowered positions.

30. The stator coil lacing machine of claim 29, wherein the lacing cord feeder tube oscillating drive includes a first crank drivingly coupled to the lacing needle drive by the driving engagement maintaining means and a second crank drivingly coupled to the lacing cord feeder tube and to the first crank.

31. The stator coil lacing machine of claim 30, wherein the first crank includes a connecting rod drivingly coupled on a first end to the driving engagement maintaining means and on a second end to the second crank and further wherein the driving engagement maintaining means includes an end block coupled to the first end of the connecting rod and formed to include an aperture and a pivot rod slidably positioned to lie within the aperture of the end block, coupled on one end to the lacing needle drive, and configured to have a length sufficient to allow the end block to travel along a portion of the length of the pivot rod as the arbor is moved between raised and lowered positions so that driving engagement between the pivot and connecting rods is maintained.

32. The stator coil lacing machine of claim 31, wherein the lacing cord feeder tube includes a key drivingly coupled to an end of the second crank.

33. The stator coil lacing machine of claim 31, wherein the lacing cord feeder tube includes an outer lacing cord feeder tube and an inner lacing cord feeder tube positioned to lie within and drivingly coupled to the outer lacing cord feeder tube.

34. The stator coil lacing machine of claim 24, wherein the advancing means includes a table on which the stator lies and means for rotating the table so the stator moves between the first and second positions, and the stator coil lacing machine further includes means for indexing the stator through an arc when positioned to lie adjacent the arbor so that stator coils of the stator can be laced, the indexing means including an indexing ring on the table and an indexing motor drivingly coupled to the indexing ring that advances the indexing ring.

35. The stator coil lacing machine of claim 34, further comprising means for uncoupling the indexing motor from the indexing ring when the rotating means moves the stator between the first and second positions.

36. The stator coil lacing machine of claim 35, wherein the uncoupling means includes an anti-rotation cam.

37. The stator coil lacing machine of claim 34, wherein the indexing means includes a first indexing ring on the table and a second indexing ring located on the table at the position unoccupied by the first indexing ring, and further wherein the indexing motor advances the indexing ring located adjacent the arbor.

38. The stator coil lacing machine of claim 37, wherein the stator is positioned to lie in the first indexing ring, a second stator is positioned to lie in the second indexing ring, and the advancing means moves the stator between the first position so that the stator lies adjacent the arbor and the second position where the stator is away from the arbor so that the stator can be removed from the table and a third stator placed in the first indexing ring, and further wherein the moving means lowers the arbor away from the stator to allow the advancing means to move the stator from the first position to the second position and raises the arbor to allow the second stator to be positioned on the arbor after the advancing means moves the stator from the first position to the second position.

* * * * *